United States Patent [19]
Hunter

[11] 3,794,229
[45] Feb. 26, 1974

[54] SENSOR FOR DETECTING WIRES TRAPPED ON A CREEL

[75] Inventor: Edward E. Hunter, Akron, Ohio

[73] Assignee: The Goodyear Tire & Rubber Company, Akron, Ohio

[22] Filed: Apr. 26, 1973

[21] Appl. No.: 354,722

[52] U.S. Cl.................. 226/25, 226/39, 200/61.13
[51] Int. Cl............................................. B65h 25/22
[58] Field of Search....... 226/11, 25, 38, 39, 44, 45, 226/195; 200/61.13; 242/75, 147, 148

[56] References Cited
UNITED STATES PATENTS

| 2,814,088 | 11/1957 | Ayars et al................. | 200/61.13 X |
| 3,599,368 | 8/1971 | Riley............................ | 200/61.13 X |
| 3,004,728 | 10/1961 | Ihle.............................. | 226/25 X |
| 2,314,070 | 3/1943 | Bogoslowsky................. | 226/25 UX |
| 851,214 | 4/1907 | Ballard.......................... | 226/11 |
| 2,896,944 | 7/1959 | Shiba............................ | 226/11 |

Primary Examiner—Allen N. Knowles
Assistant Examiner—Gene A. Church
Attorney, Agent, or Firm—F. W. Brunner; H. E. Hummer

[57] ABSTRACT

A mechanism for detecting when a wire, paying out from a spool mounted on a creel, becomes trapped on the creel. The mechanism responds to deactivate the means for paying out all of the wires from the creel, when a trapped wire becomes overly tensioned. The mechanism continually monitors all of the wires while being sensitive to each of the wires should any one of them become trapped and tensioned beyond a certain desired tension.

17 Claims, 4 Drawing Figures

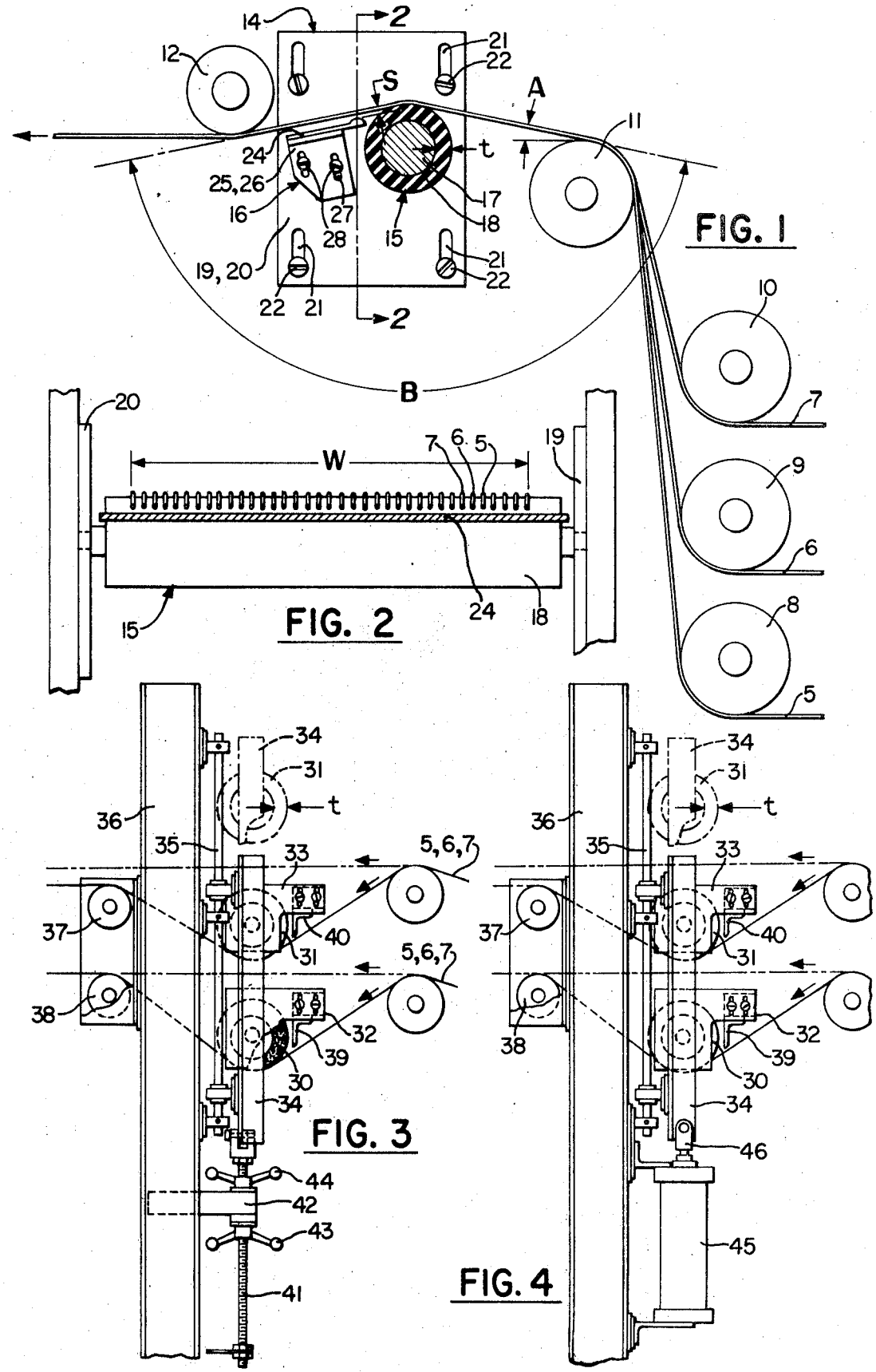

3,794,229

SENSOR FOR DETECTING WIRES TRAPPED ON A CREEL

BACKGROUND OF THE INVENTION

The invention is particularly well suited for use in conjunction with a creel designed for holding a number of spools of wire cord used in the reinforcement of tires. The individual wire cords are taken from the creel and passed in parallel array through a calendering machine where the cords are embedded in rubber material. A braking device is associated with each spool of wire for regulating the tension in the wire cords as they pay out from the creel. It is important to continuously monitor the paying out of the wire cords to detect any cord which becomes trapped on its spool, since such a cord eventually breaks and sometimes causes severe damage to the creel because of the very high tension under which the cord breaks. If this happens, the creel and calender must be shut down immediately until the creel can be repaired and the broken cord mended and rethreaded through the creel. This can be a burdensome task, since there may be as many as 1200 wire cords paying out from the creel.

The continuity of the various wire cords is presently checked by dividing the cords into smaller groups and passing each group over an elongated roller which is coupled to load cells for measuring the force applied against the roller by the group of wire cords. When the initial force on each roller is radically altered and reaches a predetermined level, the load cells react to stop operation of the creel until the cause of the increased load on the roller is determined. Thus, the tension in each cord is continuously monitored. This particular system is not very satisfactory because there may be as many as 100 to 300 wire cords passing over each roller and the breaking strength of an individual cord may be exceeded before the system can react to shut down the creel. Moreover, a slight increase in the tension of each wire cord could provide a cumulative force sufficient to trigger the mechanism for stopping the paying out of the wire cords from the creel. Also, the rollers and load cells are very expensive and require constant maintenance. Another more reliable system for detecting trapped wire cords, employs individual monitoring units which are associated with each spool of wire. This particular system is expensive because of the large number of units involved. A combination of the most favorable characteristics of the two systems should solve the problem; namely, the provision of an apparatus which can be used in conjunction with a number of wire cords while being acutely sensitive to each cord, especially any increased tension in the cord. The invention is directed to such a device.

SUMMARY OF THE INVENTION

Briefly stated, the invention is in an apparatus for detecting a trapped wire on a creel from which the wire is paying out. The apparatus comprises an elongated roller for deflecting a number of wires out of a given pathway. The roller has an elastically deformable covering for contacting the wires deflected by the roller. The roller is mounted for rotation about its longitudinal axis which is angularly disposed to the wires. Means are associated with the roller for stopping the paying out of the wires from the creel when a trapped and overly tensioned wire locally deforms or depresses the resilient covering a predetermined amount.

DESCRIPTION OF THE DRAWING

The following description of the invention will be better understood by having reference to the annexed drawing, wherein:

FIG. 1 is a section of an apparatus made in accordance with the invention, as viewed from the side;

FIG. 2 is a section of the apparatus as viewed from the line 2—2 of FIG. 1;

FIG. 3 is a side view of a second embodiment of the invention; and

FIG. 4 is a side view of still another embodiment of the invention.

DESCRIPTION OF THE INVENTION

Referring generally to the drawing and more particularly to FIGS. 1 and 2, there is shown a plurality of wires or wire cords, e.g. wires 5–7, paying out from a conventional creel (not shown). The wire cords 5–7 are moved in parallel array over a number of elongated rollers 8–10 positioned adjacent the creel. The wire cords 5–7 continue upwards and between a pair of parallel guide rolls 11 and 12 for passage to an adjacent calender where the wire cords are embedded in rubber material to form, for example, ply stock used in the construction of the carcass of a tire. An apparatus 14 is interposed between the guide rolls 11 and 12 for detecting an overly tensioned wire cord caused when the cord becomes trapped on its spool mounted on the creel.

The apparatus 14 essentially comprises an elongated sensing roller 15 for engaging and deflecting the wire cords 5–7 out of their normal pathway between the guide rolls 11 and 12, and a mechanism 16 positioned adjacent the sensing roller 15 for contacting an overly tensioned wire cord and initiating stoppage of the paying out of the wire cords from the creel.

The sensing roller 15 comprises a rigid metal core 17 having a cylindrical covering 18 which is composed of any suitable elastically deformable material, such as rubber. The rubber covering 18 should be deformable or depressible in the direction of the longitudinal axis of the roller 15 and resilient for returning to its original shape after the trapped cord is freed and excessive compressive force on the rubber covering relieved. The thickness ($t$) of the rubber covering 18 is preferably from 1 to 2 inches and desirably about 1½ inches. The hardness of the rubber covering 18, when measured in accordance with ASTM method D2240, has a type A shore hardness value which is selectively in the range of from 30 to 40. A rubber covering 18 with these physical characteristics has been found especially suitable for allowing an overly tensioned wire cord to move a desired amount out of its deflected pathway between the guide rolls 11 and 12. The sensing roller 15 is mounted for rotation about its longitudinal axis between a pair of opposing plates 19 and 20 which are positioned adjacent the creel between the pair of guide rolls 11 and 12. The plates 19 and 20 are slidably mounted by any suitable means, e.g. slot and pin means 21 and 22, such that the sensing roller 15 can be moved into and out of engagement with the wire cords 5–7. The sensing roller 15 is mounted such that its longitudinal axis is preferably normal to the wire cords 5–7, or parallel to the guide rolls 11 and 12.

The mechanism 16 for initiating the stoppage of the paying out of the wire cords 5–7 from the creel, is mounted adjacent the sensing roller 15 in spaced relation from the wire cords 5–7 as they approach, or leave the sensing roller 15. The mechanism 16 comprises a suitable metal contact or rod 24, which is preferably at least coextensive with the overall width W of the wire cords engaging the sensing roller 15. The metal contact 24 is secured between a pair of brackets 25 and 26 which, in turn, are slidably mounted on the plates 19 and 20 by any suitable means, e.g. slot and pin means 27 and 28. Thus, the spacing S between the metal contact 24 and the wire cords can be varied depending on the particular thickness and hardness of the rubber covering 18 and the angular deflection of the wire cords between the set of guide rolls 11 and 12. The wire cords 5–7 are deflected out of their normal pathway between the guide rolls 11 and 12 at an angle A, which is preferably in the range of from 30° to 45°, such that the included angle B between segments of the wire cords approaching and leaving the sensing roller 15, is in the corresponding range of from 90° to 120°.

In operation, the wire cords are taken from the creel and threaded between the guide rolls 11 and 12 for passage into the adjacent calender. The sensing roller 15 in its normal rest position is out of interfering relation with the passage of the wire cords between the guide rolls 11 and 12. The sensing roller 15 is then moved into engagement with the parallel cords and positioned to deflect the cords at an angle A of about 30 degrees, such that the included angle B is about 120 degrees. The position of the mechanism 16 is then adjusted to obtain the desired spacing S between the metal contact 24 and adjacent wire cords leaving the sensing roller 15. As previously indicated, conventional braking devices are used for placing the wire cords under a predetermined tension as they leave the creel. This tension will increase radically when a cord becomes trapped on its spool carried by the creel. Such an overly tensioned, trapped cord will immediately act to locally deform or depress the rubber covering 18 to a point where the trapped cord contacts the metal rod 24, causing a short in the circuit controlling the mechanism for paying the wires out from the creel. Thus, an overly tensioned wire cord is displaced from a normal deflected pathway to a position, or displaced pathway where the cord engages the metal contact 24 to halt paying out of all the wire cords from the creel. Low voltage wiring is used in the circuit to prevent any person coming in contact with the cords, or apparatus from receiving an electrical shock sufficient to harm the individual. The creel and calender are immediately shut down until the trapped wire cord is located and freed. The calendering operation is then resumed.

The trapped wire detectors or apparatuses 14 shown in FIGS. 3–4, essentially comprise a pair of sensing rollers 30 and 31 which are similar to the sensing roller 15 previously described. The rollers 30 and 31 are rotatably mounted in parallel relation between sets of similarly designed opposing brackets 32 and 33. The sets of brackets 32 and 33 are slidably mounted in spaced relation on a carriage 34 which is reciprocable along a pair of guide rails 35. The guide rails 35 are mounted in parallel relation on a fixed framework 36. A set of guide rolls 37 and 38 are rotatably mounted on the fixed framework 36 between the sensing rollers 30 and 31 and the calender. A pair of metal contacts 39 and 40, in the form of two stock metal angles, are associated with the sensing rollers 30 and 31 and are also adjustably mounted on the brackets 32 and 33, such that the spacing (S) between the contacts 39 and 40 and adjacent wire cords can be varied. The metal contacts 39 and 40 are located on the backside of the sensing rollers 30 and 31, as distinguished from being on the frontside of the sensing roller 15 previously described and shown in FIG. 1.

The carriage 34, shown in FIG. 3, is coupled to a pair of threaded rods 41 which extend through similar bushings 42 secured to the framework 36. A pair of turn nuts 43 and 44 are threadably mounted on each of the rods 41 on opposing sides of the bushings 42. Thus, by loosening one turn nut and tightening the other, the threaded rods 41 and attached carriage 34 are moved along the guide rails 35, to correspondingly move the sensing rollers 30 and 31 into and out of deflecting engagement with wire cords paying out from the creel.

The carriage 34, shown in FIG. 4, is coupled to a pair of air cylinders 45 and pistons 46 for reciprocating the sensing rollers 30 and 31 to and from the wire cords, rather than the threaded rods 41 and turn nuts 43 and 44 of FIG. 3. This is the basic difference between the two embodiments shown in FIGS. 3 and 4.

Thus, there is provided an apparatus which can accommodate a number of wire cords while being very responsive or sensitive to an increase in tension in any one of the cords. The rubber covering of the sensing roller is made sufficiently thick and of adequate hardness to allow an overly tensioned and trapped wire to depress the rubber material a predetermined amount which is correlated to a specific tension which is lower than the tension under which the cord will break. Thus, a trapped cord will always engage the metal contact to stop operation of the creel and calender before the cord is tensioned to the point of breaking.

What is claimed is:

1. An apparatus for detecting a trapped wire on a creel from which the wire is paying out, comprising in combination:
   a. a roller for deflecting a plurality of wires paying out from the creel, the longitudinal axis of the roller being angularly disposed to the axial direction that the wires cross the roller, the roller including a cylindrical covering composed of elastically deformable material for contacting the wires:
   b. means for mounting the roller for rotation about its longitudinal axis; and
   c. means responsive to a predetermined deformation of the material relative to the longitudinal axis of the roller by an overly tensioned wire, for stopping the paying out of the wires from the creel.

2. The apparatus of claim 1, which includes:
   d. means for moving the roller and covering into and out of engagement with the wires paying out from the creel.

3. The apparatus of claim 2, wherein the rubber material has a thickness $(t)$ which is between 1 and 2 inches, and an A-type shore hardness value which is between 30 and 40, when measured in accordance with ASTM method designated D2240.

4. The apparatus of claim 2, which includes means for paying out the plurality of wires from the creel, and means for guiding the wires from the creel adjacent the roller.

5. The apparatus of claim 2, wherein the contact, when touched by a wire, causes a short in the electrical circuit including the means for paying out the wires from the creel.

6. The apparatus of claim 2, wherein the included angle ($b$) measured between wire segments approaching and leaving the roller, is in the range of from 90° to 120° when the apparatus is monitoring the paying out of the cords from the creel.

7. The apparatus of claim 1, wherein the material includes rubber material.

8. The apparatus of claim 1, wherein the rubber material has a type A shore hardness value in the range of from 30 to 40 when measured in accordance with ASTM method designated D2240.

9. The apparatus of claim 8, wherein the thickness of the elastic covering is from 1 to 2 inches measured in a radial direction relative to the rotational axis of the roller.

10. The apparatus of claim 1, wherein the means for stopping the paying out of the wires from the creel includes at least one metal contact for engaging each of the wires, and means for mounting the metal contact adjacent the roller in spaced relation from the wires, the spacing between the contact and wires being in corresponding relation to the predetermined deformation of the material by an overly tensioned wire.

11. The apparatus of claim 10, wherein the means for mounting the contact includes means for varying the spacing between the contact and wires.

12. The apparatus of claim 10, wherein the contact when touched by a wire, causes a short in the electrical circuit controlling paying out of the wires from the creel.

13. The apparatus of claim 12, wherein the electrical circuit includes voltage which is sufficiently low to prevent harmful electrical shocks to individuals which are in shock receiving relation to said circuit.

14. An apparatus for detecting a trapped wire on a creel from which the wire is paying out, comprising in combination:
   a. an elongated roller having a cylindrical covering of rubber material, the roller having its longitudinal axis angularly disposed to a plurality of wires paying out from the creel;
   b. means for mounting the roller for rotation about its longitudinal axis for movement into and out of engagement with the plurality of wires paying out from the creel;
   c. at least one metal contact disposed adjacent the roller in spaced relation from the plurality of wires, the contact being angularly disposed to the wires; and
   d. means responsive to a wire touching the contact, for stopping the paying out of the wires from the creel.

15. The apparatus of claim 14, which includes means for mounting the metal contact parallel to the longitudinal axis of the roller, and the means for mounting the roller includes means for mounting the roller normal to the wires contacting the roller.

16. The apparatus of claim 15, wherein the means for mounting the contact includes means for varying the spacing(s) between the metal contact and wires.

17. The apparatus of claim 16, wherein the hardness and thickness ($t$) of the rubber material is such that the rubber material is depressible in corresponding relation to a predetermined increase in tension in any one of the wires.

* * * * *